April 24, 1928.   S. L. LEVITT   1,667,351
TIRE REMOVER
Filed March 9, 1927    3 Sheets-Sheet 1
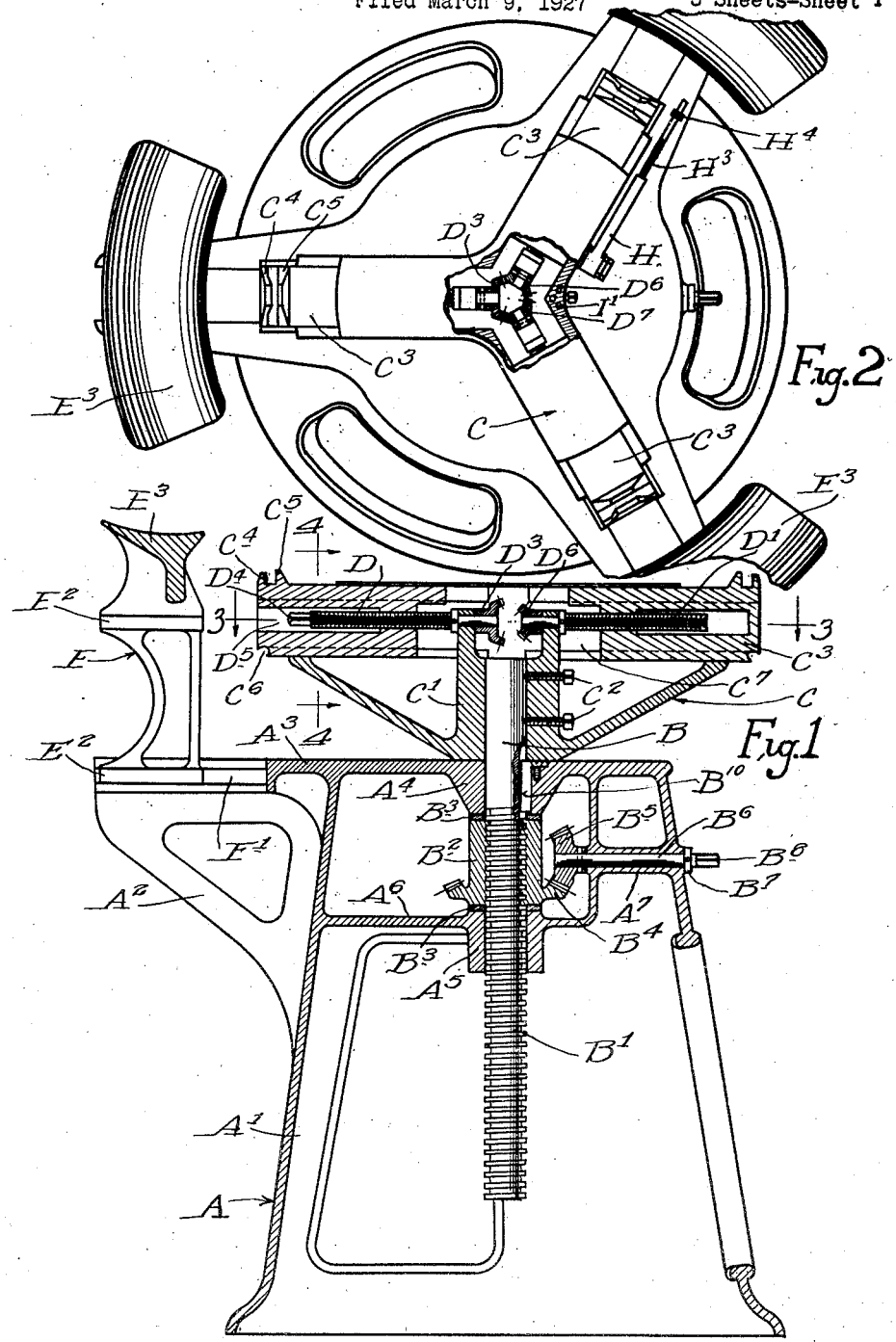

April 24, 1928.
S. L. LEVITT
1,667,351
TIRE REMOVER
Filed March 9, 1927
3 Sheets-Sheet 2
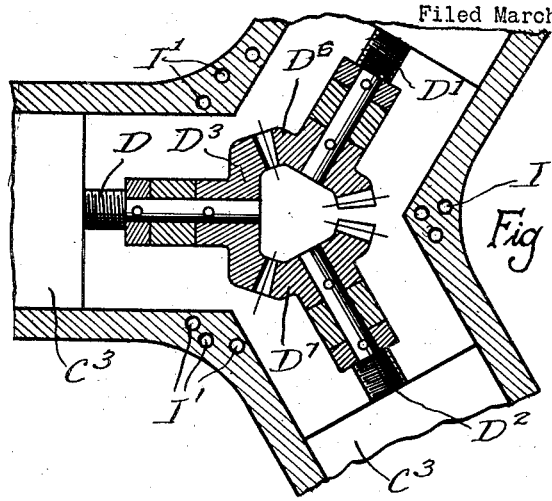
Fig. 3.
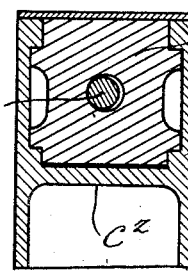
Fig. 4.
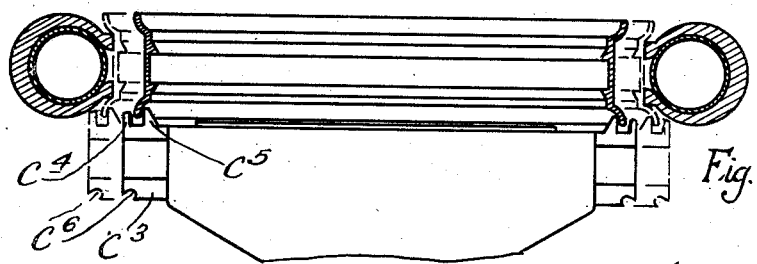
Fig. 5.
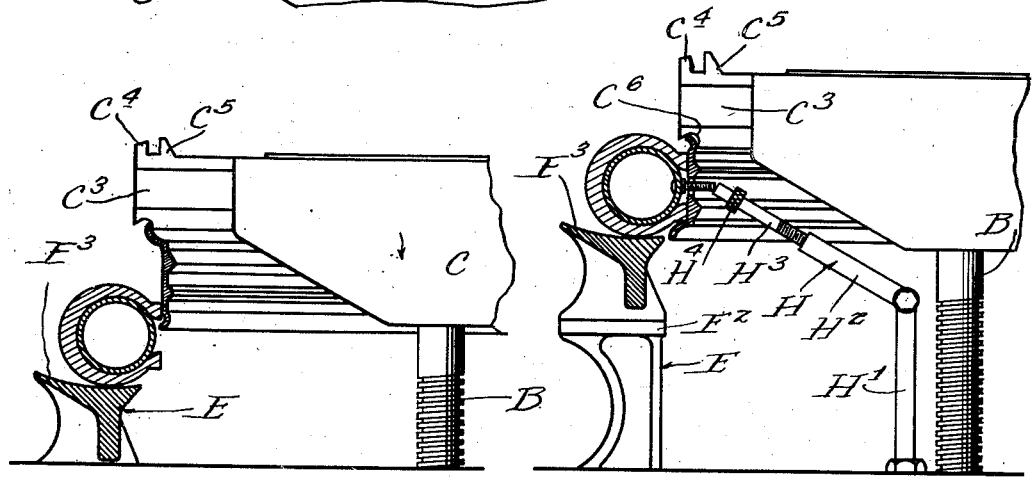
Fig. 6.
Fig. 7.
Witnesses:-
Inventor:-
Samuel L. Levitt
by Parker & Carter
Attorneys

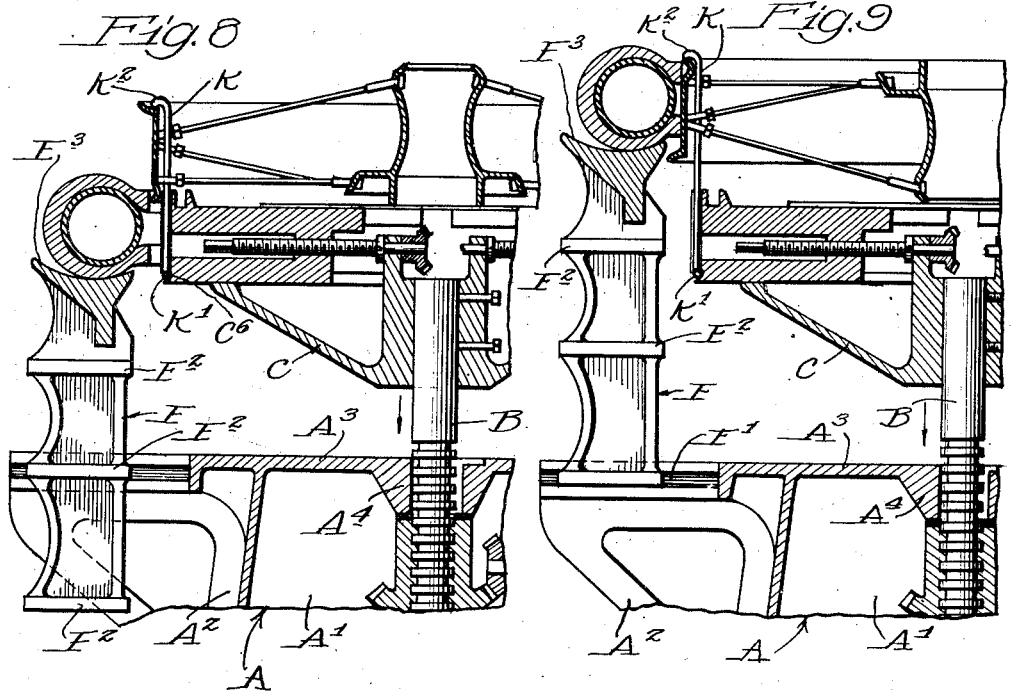
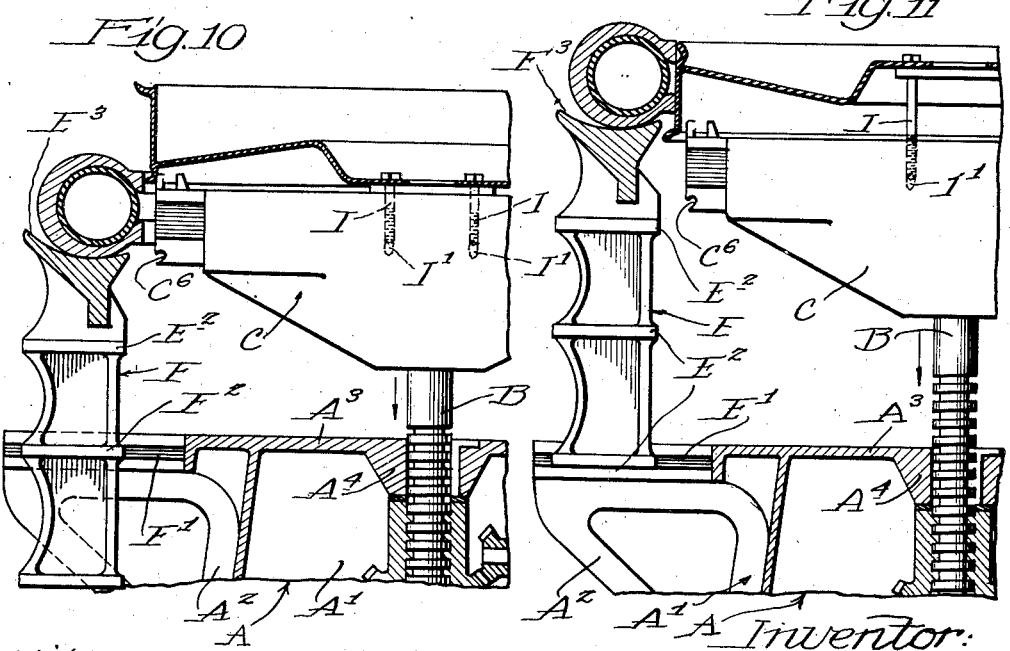

Patented Apr. 24, 1928.

1,667,351

UNITED STATES PATENT OFFICE.

SAMUEL L. LEVITT, OF CHICAGO, ILLINOIS.

TIRE REMOVER.

Application filed March 9, 1927. Serial No. 173,807.

My invention relates to a rim or tire remover, and particularly to an apparatus for separating rims or wheels from tires. One object of my invention is to provide a machine which shall easily and quickly remove tires from rims or wheels, and which shall be adaptable for use with both solid and split rims. Another object is the provision of a machine which shall also be able quickly and easily to remove tires from discs or wire wheels as well as from detachable rims.

Other objects will appear from time to time in the course of the specification and claims.

I illustrate my invention more or less diagrammatically in the accompanying drawings, wherein—

Figure 1 is a vertical section;

Figure 2 is a plan view;

Figure 3 is a detailed horizontal section along the line 3—3 of Figure 1, on an enlarged scale;

Figure 4 is a section along the line 4—4 of Fig. 1;

Figure 5 is a diagrammatic vertical section illustrating the removal of a tire from a split rim;

Figure 6 is a diagrammatic vertical section illustrating the application of a rim to a tire;

Figure 7 is a diagrammatic vertical section illustrating a mechanism for controlling the position of the valve stem;

Figure 8 is a vertical section illustrating the application of a wire wheel to a tire;

Figure 9 is a similar section illustrating the removal of a wire wheel from a tire;

Figure 10 is a view similar to Figure 8, with the substitution of a disc wheel; and Figure 11 is a view similar to Figure 9 substituting a disc wheel.

Like parts are illustrated by like symbols throughout the specification and claims.

A generally indicates any suitable base element, which includes the pedestal $A^1$ and the radial supporting members $A^2$ with the intermediate upper plate or surface $A^3$ overlying the pedestal proper.

$A^4$ is an upper bearing, herein shown as formed integrally with the member $A^3$ and $A^5$ is a lower bearing, vertically aligned with the bearing $A^4$ and connected to the pedestal for example by the web member $A^6$. $A^7$ is a horizontally located bearing member positioned intermediate the vertically disposed bearings $A^4$ $A^5$.

B indicates a vertical shaft adapted for axial movement along bearings $A^4$ $A^5$, which may be feathered as at $B^{10}$, or otherwise held against rotation. It is provided with a worm portion $B^1$ in mesh with a nut $B^2$ positioned between the bearing members $A^4$ and $A^5$ and separated from them for example by the anti-frictional washers $B^3$. The nut $B^2$ is provided with a bevel gear portion $B^4$ in mesh with a pinion $B^5$ on the shaft $B^6$ which rotates within the bearing $A^7$. Said shaft is provided with a collar $B^7$ adapted to hold it against axial movement, and is squared or formed at its end as at $B^8$ to make it readily rotatable by means of any suitable crank or tool.

At the upper end of the shaft B is mounted a working head generally indicated as C and having a central hub portion $C^1$ which may be secured to the shaft B as by the bolts $C^2$. Projecting from the central hub portion $C^1$ are a plurality of radial supporting or track members $C^2$ along which are radially movable the tire or rim engaging members or slides $C^3$. Each such member or slide $C^3$ has adjacent the upper edge of its outer end the opposed rim engaging members $C^4$ $C^5$, adapted to engage opposite sides of a rim superposed upon the working head C. Each such slide also has a notch or indentation $C^6$ adapted to engage the edge of a tire rim located beneath the slide.

The slide members $C^3$ are controlled by the worms, D, $D^1$, $D^2$, as shown in Figures 1 and 2. The worm D has pinned to its inner end the bevel gear $D^3$, the worm shaft being outwardly squared as at $D^4$ to receive any suitable rotating tool, the slide being apertured as at $D^5$ to permit access thereto. The worm shafts $D^1$ and $D^2$ are provided with bevel pinions $D^6$ $D^7$ in mesh with the pinion $D^3$. It will be understood that rotation of the worm D rotates the worms $D^1$ and $D^2$ and thus causes a unitary axial movement of all the slide members $C^3$.

Mounted upon the radially projecting members $A^2$ upon the base A, as shown in Figure 1, is the tire supporting member generally indicated as E. Each member $A^2$ is provided with a pair of opposed horizontal grooves $E^1$ in which ride the flanges $E^2$ of the member E. In Figure 1 the member E is illustrated as having two of such guide flange members and in Figures 8 to 11 it is illustrated as having three. The number and spacing of such flanges of course is a matter of election. E³ is the tire receiving portion of the member E, shown as of generally arcuate form and upwardly concave.

It will be realized that whereas I have described and shown a practical and operative device, nevertheless many changes might be made in the size, number, shape and disposition of parts without departing from the spirit of my invention. I therefore wish my description and drawings to be taken as in a broad sense illustrative and diagrammatic rather than as limiting me to my specific showing.

The use and operation of my invention are as follows:

I illustrate a machine for removing tires from demountable rims or wheels. It is current practice to employ spare rims or wheels with inflated tires mounted thereon. The spares may be so carried for a long period, and in the course of such carriage, or in the actual use of the rim or wheel, the tire may become tightly attached to the rim. For these and other reasons it is frequently highly difficult to remove a tire manually from rim or wheel and I have therefore provided a mechanism for the ready removal and replacement of tires. My device is adaptable for the removal of tires from or the application of tires to split rims and solid rims, disc wheels and wire wheels.

When I wish to remove a solid rim from a tire I place the rim and tire about the working head, with the member E in raised position, the tire resting upon the arcuate concave portion E³. I then adjust the solid members C³ in position so that the notches C⁶ engage the upper edge of the rim, the securing flange of the rim having been previously removed. The slides C³ are adjusted by rotation of the worm D, which in turn rotates the worms D¹ and D². When the notches are properly positioned to grip the rim, rotation of the shaft B⁶ in the proper direction draws the vertical worm B¹ down through its bearings and with it the entire working head, until the rim has been drawn through and out of the tire. This process is illustrated in Figure 7.

I prevent the valve of the inner tube from being caught in the rim by the use of the member generally indicated as H, which includes the generally vertically fixed portion H¹, the portion H² pivoted thereto and the portion H³ screw threaded thereto and provided with a knurled flange H⁴. When the plunger is in the position shown in Figure 7, the downward movement of the head automatically thrusts the valve stem of the inner tube through the aperture in the rim through which it normally passes.

When I desire to replace the tire on the solid rim I may place the tire supporting member E in lower position, as shown in Figure 6, with the tire positioned thereupon. The rim is placed about the working head B upon the tire and is gripped by the slides, as shown in Figure 6, its upper edge penetrating the notches C⁶. The shaft B⁷ is then rotated to draw the vertical worm B¹, and with it the member B, downwardly to thrust the rim into the central aperture of the tire.

In removing or applying a split rim I place the rim upon the upper portion of the slide member C³ with the lower edge of the rim penetrating the space between the upwardly projecting lugs C⁴ and C⁵. The rim is thus positively gripped and the slides may be moved axially inwardly to release the tire, or, when the tire is being applied, may be moved axially outwardly in order to return the rim into operative contact with the tire.

In removing tires from a disc wheel, or in applying tires to a disc wheel I find it preferable to bolt the wheel positively to the working member B. I therefore provide the bolts I, shown in Figures 10 and 11, which penetrate the screw threaded apertures I¹ which correspond, in relation to the disc wheel, to the apertures normal to such wheel for securing it in working relation with the automobile axle.

In handling a wire wheel I find it preferable to lay the wheel upon the top of the working head B and to clamp it in position by means of the wire hooks or holders K shown in Figures 8 and 9. Each such holder K is provided with a lower loop portion K¹ adapted to seat in the notch C⁶ and an upper hook portion K² adapted to overlie the edge of the rim.

I claim:

1. A tire removing and applying device which includes a base, tire supporting means thereon, a working head, rim or wheel engaging means mounted thereon, means for imparting to said working head a vertical movement in relation to said tire supporting means, and means for forcing the tire valve out of line with the wheel or rim in response to such relative movement of tire and rim or wheel.

2. In a tire removing and applying device, a base, means mounted thereon for supporting a tire in a substantially horizontal position above said base, a working head and means for moving it along an axis perpendicular to said tire, rim or wheel engaging members adjustably mounted thereon, and means for moving the tire valve out of line with said rim in response to such relative motion of the rim and tire, comprising a pivoted valve engaging member.

3. In a tire removing and applying device, a working base, means mounted thereon for supporting a tire in substantially horizontal position, a working head and means for moving it along an axis perpendicular to said tire, means for securing a tire or rim in relation to said working head and means for holding the tire valve out of line with the rim during relative motion of tire and rim, including a member in pivotal relation with the base and adapted to engage the end of the valve.

4. In a tire removing and applying device, a base, means mounted thereon for supporting a tire in a substantially horizontal position, a working head and means for moving it along an axis perpendicular to said base, a plurality of radially movable members positioned upon said working head and projecting outwardly therefrom, and means for actuating them, each such member having a pair of opposed rim engaging lugs projecting from its upper side, and a rim engaging notch upon its lower side.

5. In a tire removing and applying device, a working base, means mounted thereon for supporting a tire, a working head and means for moving it along an axis perpendicular to the plane of the tire, a plurality of rim or wheel engaging members positioned upon said working head and means for moving them radially toward and away from the tire, and means for securing a wheel to the upper portion of said working head, including a plurality of hooks, associated with said radially movable rim or wheel engaging members, and adapted to overlie the rim of the wheel.

6. In a tire removing and applying device, a base, means mounted thereon, and normally fixed during use, for supporting a tire in a substantially horizontal position, a working head and means for moving it along an axis perpendicular to said base and tire, a plurality of radially movable members positioned upon said working head and projecting outwardly therefrom, and means for actuating them, each such member including a block radially slidable in relation to said head, each such block having rim engaging means adjacent its upper and lower outer edges.

7. In a tire removing and applying device, a base, a plurality of tire supporting members, adjustable as to height, mounted on said base, and a working head and means for moving it along an axis perpendicular to the plane of the tire, said working head having a plurality of radially movable members mounted thereupon for sliding movement in relation to said working head, in a plane parallel with the plane in which lies the tire.

8. In a tire removing and applying device, a base, a plurality of tire supporting members, adjustable as to height, mounted on said base, and a working head and means for moving it along an axis perpendicular to the plane of the tire, said working head having a plurality of radially movable members mounted thereupon for sliding movement in relation to said working head, in a plane parallel with the plane in which lies the tire, ach such tire supporting member including an arcuate concave tire engaging member, a body portion associated therewith and a plurality of vertically spaced lateral flanges extending horizontally therefrom, the base member being vertically slotted to receive said body members and having horizontal apertures to receive said flanges.

Signed at Chicago, county of Cook and State of Illinois, this 4th day of March, 1927.

SAMUEL L. LEVITT.